US012453604B2

(12) United States Patent
Zuhars

(10) Patent No.: US 12,453,604 B2
(45) Date of Patent: Oct. 28, 2025

(54) METHOD OF VERIFYING TRACKING ARRAY POSITIONAL ACCURACY

(71) Applicant: THINK SURGICAL, INC., Fremont, CA (US)

(72) Inventor: Joel Zuhars, Fremont, CA (US)

(73) Assignee: Think Surgical, Inc., Fremont, CA (US)

( * ) Notice: Subject to any disclaimer, the term of this patent is extended or adjusted under 35 U.S.C. 154(b) by 536 days.

(21) Appl. No.: 17/422,465

(22) PCT Filed: Feb. 5, 2020

(86) PCT No.: PCT/US2020/016763
§ 371 (c)(1),
(2) Date: Jul. 13, 2021

(87) PCT Pub. No.: WO2020/163457
PCT Pub. Date: Aug. 13, 2020

(65) Prior Publication Data
US 2022/0071713 A1 Mar. 10, 2022

Related U.S. Application Data

(60) Provisional application No. 62/801,252, filed on Feb. 5, 2019.

(51) Int. Cl.
*A61B 34/20* (2016.01)
*A61B 17/16* (2006.01)
(Continued)

(52) U.S. Cl.
CPC .......... *A61B 34/20* (2016.02); *A61B 17/1615* (2013.01); *A61B 17/86* (2013.01);
(Continued)

(58) Field of Classification Search
CPC .......... A61B 34/20; A61B 34/25; A61B 34/30
See application file for complete search history.

(56) References Cited

U.S. PATENT DOCUMENTS

| 6,322,567 | B1 | 11/2001 | Mittelstadt et al. |
| 11,457,980 | B2 | 10/2022 | Bonny et al. |
| (Continued) | | | |

FOREIGN PATENT DOCUMENTS

| JP | 2018534960 A | 11/2018 |
| JP | 2019501677 A | 1/2019 |
| (Continued) | | |

OTHER PUBLICATIONS

Supplementary European Search Report issued in EP20753220, dated Oct. 4, 2022.
(Continued)

*Primary Examiner* — Si Ming Ku
(74) *Attorney, Agent, or Firm* — MaxGoLaw PLLC

(57) ABSTRACT

A method for verifying the positional accuracy of a tracking reference device is provided that includes a tracking reference device attached to a bone. The bone is then registered with respect to a coordinate frame of the tracking reference device. A verification mark on the bone is then created where the position of the verification mark is recorded, by way of a tracking system, with respect to the tracking reference device. The positional accuracy of the tracking reference device is verified by instructing an end-effector of a robotic-assisted surgical device to align with the verification mark on the bone, and wherein if the end-effector does not align with the verification mark, the positional accuracy of the tracking reference device is compromised. A surgical system for performing the computerized method is also provided.

20 Claims, 6 Drawing Sheets

(51) Int. Cl.
*A61B 17/86* (2006.01)
*A61B 34/00* (2016.01)
*A61B 34/30* (2016.01)
*A61B 90/00* (2016.01)

(52) U.S. Cl.
CPC .............. *A61B 34/25* (2016.02); *A61B 34/30* (2016.02); *A61B 90/39* (2016.02); *A61B 2017/1602* (2013.01); *A61B 2034/2051* (2016.02); *A61B 2034/207* (2016.02); *A61B 2090/3916* (2016.02); *A61B 2090/3945* (2016.02); *A61B 2090/3958* (2016.02); *A61B 2090/3991* (2016.02)

(56) References Cited

U.S. PATENT DOCUMENTS

| | | | |
|---|---|---|---|
| 11,717,353 | B2 | 8/2023 | Zuhars et al. |
| 2014/0039520 | A1 | 2/2014 | Haider et al. |
| 2014/0206990 | A1* | 7/2014 | Epstein .................. A61B 90/37 600/587 |
| 2014/0275940 | A1* | 9/2014 | Hladio .................. A61B 90/70 600/407 |
| 2017/0312035 | A1 | 11/2017 | May et al. |
| 2017/0345177 | A1* | 11/2017 | Hladio .................. G06T 7/246 |
| 2018/0014890 | A1 | 1/2018 | Stanton et al. |
| 2018/0153624 | A1 | 6/2018 | Hughes et al. |
| 2018/0199995 | A1 | 7/2018 | Odermatt et al. |
| 2018/0200001 | A1 | 7/2018 | Erbe |
| 2019/0021798 | A1 | 1/2019 | Netravali et al. |

FOREIGN PATENT DOCUMENTS

| | | | | |
|---|---|---|---|---|
| WO | WO-2017087371 | A1 * | 5/2017 | ............. A61B 34/20 |
| WO | WO-2017151751 | A1 * | 9/2017 | ............. A61B 34/20 |

OTHER PUBLICATIONS

Int'l Search Report for PCT/US2020/016763, dated Jun. 9, 2020.
Office Action issued in corresponding Japanese Patent Appln. No. 2021-543250, dated Oct. 17, 2023 (machine translation).

* cited by examiner

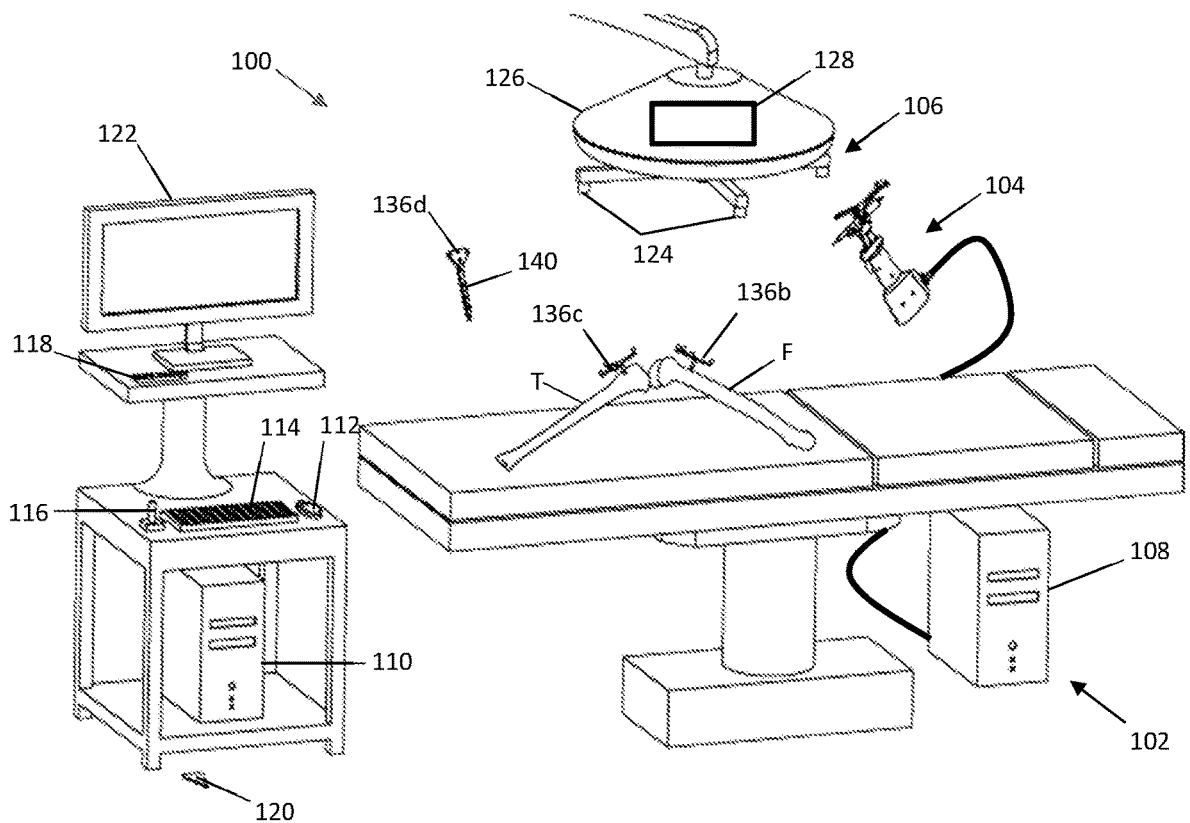
FIG. 2A
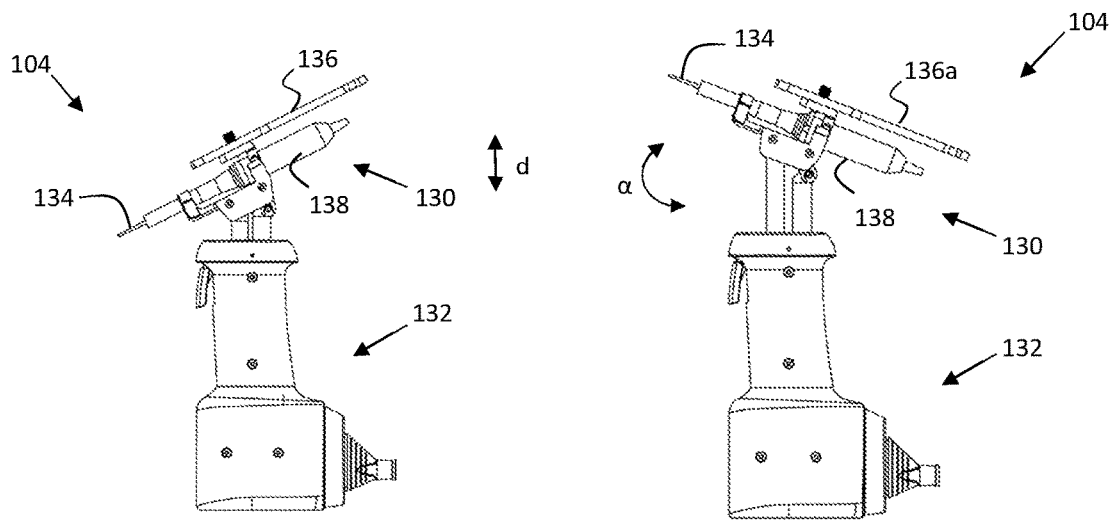
FIG. 2B
FIG. 2C

METHOD OF VERIFYING TRACKING ARRAY POSITIONAL ACCURACY

TECHNICAL FIELD

The present invention generally relates to the field of robotic-assisted orthopedic surgery, and more particularly to a method for verifying tracking array positional accuracy during a robotic-assisted orthopedic surgery.

BACKGROUND

Throughout a lifetime, bones and joints become damaged and worn through normal usage, disease conditions, traumatic events, or a combination thereof. Arthritis is a leading cause of joint damage that leads to cartilage degradation, pain, stiffness, and bone loss overtime. Arthritis can also cause the muscles articulating the joints to lose strength and become painful.

If the pain associated with the dysfunctional joint is not alleviated by less-invasive therapies, a joint arthroplasty procedure is considered as a treatment option. Joint arthroplasty is an orthopedic procedure in which an arthritic or dysfunctional joint surface is replaced with an orthopedic prosthesis.

The accurate placement and alignment of such an implant is a large factor in determining the success of joint arthroplasty. A slight misalignment in implant positioning may result in poor wear characteristics, reduced functionality, poor clinical outcomes, decreased prosthetic longevity, or a combination thereof.

In order to achieve accurate implant placement and alignment, a surgical plan is typically generated using 3-D bone models of the patient's bones and one or more implant models of a desired implant. A user positions the implant models relative to the bone models to designate the best overall fit, fill, and alignment of a given implant relative to the patient's bones. The plan is then transferred to a robotic-assisted surgical device in the operating room (OR) to accurately execute the selected plan. One particular robotic-assisted surgical device is a hand-held computer-assisted surgical device as described in U.S. Pat. App. Pub. 2018/0344409; the contents of which are incorporated by reference herein. The hand-held device assists a user in accurately aligning two or more pins in a bone, where a cut-guide having guide slots is assembled thereon. The pins are positioned on the bone such that when the cut guide is assembled thereon, the guide slots are aligned to guide a surgical saw in making the planned cuts. Another robotic-assisted surgical device is a robotic surgical system that make the bone cuts directly by controlling a saw, a cutter (e.g., end-mill), or a reamer. For any robotic-assisted surgical device, the bone's position and orientation (POSE) needs to be known relative to the device and the surgical plan to accurately create the cuts on bone according to the plan. The bone's POSE relative to the device and plan may be initially determined using a process called registration. Several registration methods are known in the art as described in U.S. Pat. Nos. 6,033,415 and 5,951,475. After registration, the bone needs to be tracked to update the bone's POSE in real-time relative to the surgical device.

Conventional tracking systems include optical tracking systems, electromagnetic tracking systems, and mechanical tracking systems. Each of these tracking systems require a tracking reference device fixed to the patient's bone prior to registration to provide a link for the tracking system to track the bone. Then after registration, the tracking system can accurately track the bone in real-time. For example, an optical tracking system utilizes a tracking array fixed to the patient's bone, an electromagnetic tracking system, utilizes a magnetic field transmitter fixed to the bone, and a mechanical tracking system utilizes a distal end of one or more articulating linkages fixed to the bone.

One problem associated with system however, is the inadvertent movement of the reference device relative to the bone after registration. If the reference device unknowingly moves relative to the bone after registration, the relative POSE between the bone and the surgical plan will shift by the amount of movement, and therefore shift the creation of the cuts or alignment of the pins by a similar amount of the movement. This can severely affect the alignment of the implants on the bone and result in poor clinical outcomes.

Thus, there exists a need for a method to efficiently and effectively verify the positional accuracy of a tracking reference device relative to a bone during a robotic-assisted orthopedic surgical procedure.

SUMMARY OF THE INVENTION

A method for verifying the positional accuracy of a tracking reference device is provided that includes a tracking reference device attached to a bone. The bone is then registered with respect to a coordinate frame of the tracking reference device. A verification mark on the bone is then created where the position of the verification mark is recorded, by way of a tracking system, with respect to the tracking reference device. The positional accuracy of the tracking reference device is verified by instructing an end-effector of a robotic-assisted surgical device to align with the verification mark on the bone, and wherein if the end-effector does not align with the verification mark, the positional accuracy of the tracking reference device is compromised.

A surgical system for performing the computerized method detailed above includes a surgical robot or hand-held surgical device with an end effector tool. A computing system is provided that includes a computer, user-peripherals, and a monitor for displaying a graphical user interface (GUI). At least one of a mechanical digitizer or a non-mechanical tracking system is also provided. The computer includes a processor, non-transient storage memory, and other hardware, software, data and utilities to execute the method. The user peripherals allow a user to interact with the GUI and include user input mechanisms of at least one of a keyboard, mouse, pendant, hand-held controller, a touchscreen capability on the monitor, or user input mechanisms directly integrated with the surgical robot or hand-held surgical device.

BRIEF DESCRIPTION OF THE DRAWINGS

The present invention is further detailed with respect to the following drawings that are intended to show certain aspects of the present of invention, but should not be construed as limit on the practice of the invention, wherein:

FIG. 2A is a schematic that depicts a surgical system in the context of an operating room (OR) with a hand-held surgical device, where the surgical system is capable of performing embodiments of the inventive method for verifying tracking array positional accuracy during a robotic-assisted orthopedic surgery;

FIGS. 2B and 2C are detailed views of the hand-held surgical device of FIG. 2A that show minimal height and rotation (FIG. 2B) and maximal height and rotation (FIG. 2C);

FIG. 3A depicts no movement of a tracking reference device relative to the femur, and FIG. 3B depicts movement of the tracking reference device relative to the femur;

FIG. 5A depicts no movement of a tracking reference device relative to the femur, and FIG. 5B depicts movement of the tracking reference device relative to the femur.

DETAILED DESCRIPTION

Figure 1:
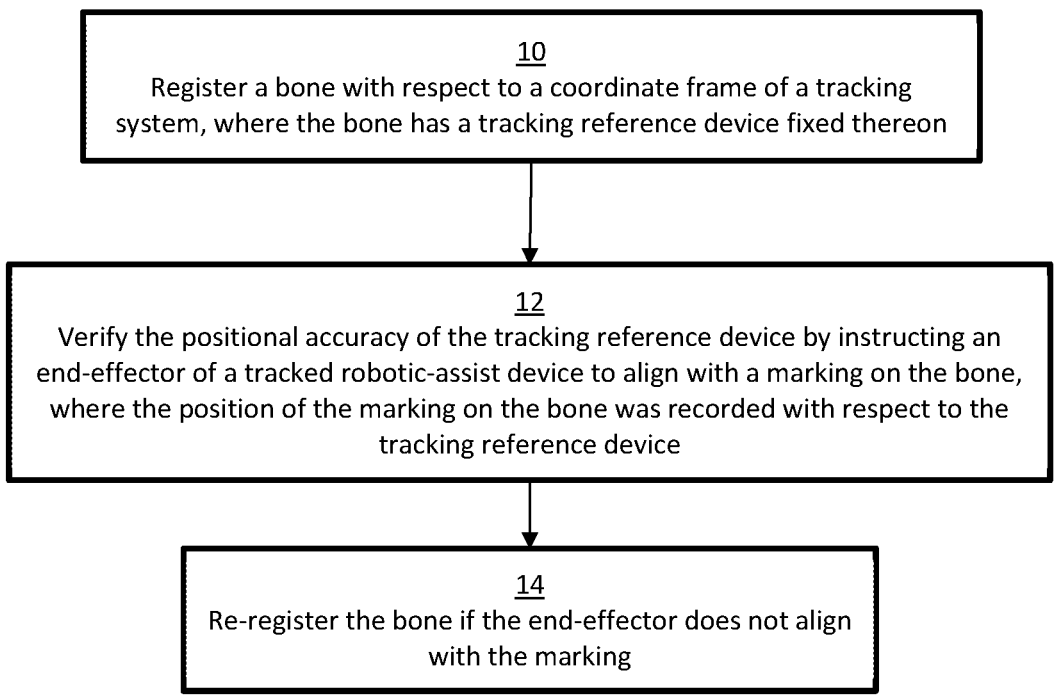
FIG. 1 is a flowchart of a method for verifying the positional accuracy of a tracking reference device during a robotic assisted-surgical procedure in accordance with an embodiment of the invention.

The present invention has utility as a method to verify tracking array positional accuracy during a robotic-assisted orthopedic surgery. The present invention will now be described with reference to the following embodiments. As is apparent by these descriptions, this invention can be embodied in different forms and should not be construed as limited to the embodiments set forth herein. Rather, these embodiments are provided so that this disclosure will be thorough and complete, and will fully convey the scope of the invention to those skilled in the art. For example, features illustrated with respect to one embodiment can be incorporated into other embodiments, and features illustrated with respect to a particular embodiment may be deleted from the embodiment. In addition, numerous variations and additions to the embodiments suggested herein will be apparent to those skilled in the art in light of the instant disclosure, which do not depart from the instant invention. Hence, the following specification is intended to illustrate some particular embodiments of the invention, and not to exhaustively specify all permutations, combinations, and variations thereof.

Further, it should be appreciated that although the systems and methods described herein make reference to the proximal femur, the systems and methods may be applied to other bones and joints in the body illustratively including the hip, ankle, elbow, wrist, skull, and spine, as well as revision of initial repair or replacement of any of the aforementioned bones or joints.

As used herein, the term "pre-operative bone data" refers to bone data used to pre-operatively plan a procedure before making modifications to the actual bone. The pre-operative bone data may include one or more of the following. An image data set of a bone (e.g., computed tomography, magnetic resonance imaging, ultrasound, X-ray, laser scan), a virtual generic bone model, a physical bone model, a virtual patient-specific bone model generated from an image data set of a bone, or a set of data collected directly on a bone intra-operatively commonly used with imageless computer-assist devices.

As used herein, the term "registration" refers to the determination of the POSE and/or coordinate transformation between two or more objects or coordinate systems such as a computer-assist device, a bone, pre-operative bone data, surgical planning data (i.e., an implant model, cut-file, virtual boundaries, virtual planes, cutting parameters associated with or defined relative to the pre-operative bone data), and any external landmarks (e.g., a fiducial marker array (also referred to herein as a tracking array), or an electromagnetic sensor) associated with the bone, if such landmarks exist. Methods of registration known in the art are described in U.S. Pat. Nos. 6,033,415; 8,010,177; and 8,287,522.

As used herein, the term "real-time" refers to the processing of input data within milliseconds such that calculated values are available within 2 seconds of computational initiation.

Also described herein are "robotic-assisted surgical devices." A robotic-assisted surgical device refers to any device/system requiring computer control of an end-effector to aid in a surgical procedure. Examples of a robotic surgical device include active and haptic 1-N degree of freedom hand-held surgical devices and systems, autonomous serial-chain manipulator systems, haptic serial chain manipulator systems, parallel robotic systems, or master-slave robotic systems, as described in, for example, U.S. Pat. Nos. 5,086,401; 7,206,626; 8,876,830; and 8,961,536; U.S. Pat. Pub. No. 2013/0060278; and U.S. Pat. App. Pub. 2018/344409. Specific embodiments of robotic surgical systems are further described below.

With reference now to the figures, FIG. 1 depicts a flowchart of an embodiment of an inventive method for verifying the positional accuracy of a tracking reference device during a robotic assisted-surgery. After the bone is exposed using traditional techniques, the bone having an affixed tracking reference device is registered with respect to a coordinate frame of a tracking system at 10. At any point after registration, the positional accuracy of the tracking reference device is verified by instructing an end-effector of a robotic-assisted surgical device to align with a marking on the bone, where the position of the marking on the bone was defined in the coordinate frame of the tracking system after the registration and prior to verification at 12. If the end-effector does not align with the marking, the positional accuracy of the tracking reference device is compromised and the bone is re-registered in the coordinate frame of the tracking system at 14. Specific embodiments of the method are further described below.

A tracking reference device illustratively includes a tracking array, an electromagnetic sensor, a distal end of mechanical tracking system, or any other device that affixed to a bone for the purposes of permitting a tracking system to track the bone. The tracking reference device may be fixed to the bone using techniques known in the art including the use of bone pins, bone screws, clamps, or other fastening elements. It is important that the tracking reference device is rigidly affixed to the bone to permit accurate tracking. A tracking system may refer to an optical tracking system for tracking a tracking array, a mechanical tracking system having a set of links and joints that tracks a distal end of the links or a probe attached to the distal link, or an electromagnetic generator that emits an electromagnetic field to track the electromagnetic sensors.

After the tracking reference device is fixed to the bone, the bone is registered. The bone is registered using registration techniques known in the art that illustratively include point-to-point matching, point-to-surface matching, laser scanning, image-to-image matching, or image-free registration techniques. The bone is registered with respect to the coordinate frame of the tracking reference device to permit a tracking system to accurately track the bone. The bone is typically registered to pre-operative bone data, where the pre-operative bone data includes a virtual model of the bone with instructions to modify the bone. In a particular embodiment, the bone is registered with respect to the coordinate frame of a tracking array that is tracked by an optical tracking system, such that the optical tracking system can track the bone. The optical tracking system further tracks the end-effector of a robotic surgical device by way of a tracking array attached to the robot and can therefore track the position of the end-effector relative to the bone. In another embodiment, the bone is registered with respect to the coordinate frame of a mechanical tracking system, or the coordinate frame of a surgical robot. The end-effector of a surgical robot may be used to digitize points on the bone for registration, or the surgical robot may having a mechanical tracking system attached therewith. In a further embodiment, the bone is registered with respect to an electromagnetic tracking system. After registration, the tracking system can accurately track the bone by way of the tracking reference device.

At any point after registration, the positional accuracy of the tracking reference device may be verified by aligning an end-effector of a robotic system with a previously made/installed verification mark on the bone, where the POSE of the verification mark was defined with respect to the coordinate frame of the tracking reference device prior to any potential positional movements of the tracking reference device relative to the bone. The verification mark may be in the form of a physical hole, imprint, or notch created in the bone. The verification mark may alternatively be in the form of a device (e.g., a bone-pin) installed on the bone. In a particular embodiment, the marking is made by a robotic system as further described below.

With reference to FIG. 2A a particular embodiment of a prior art surgical system 100 in the context of an operating room (OR) with a hand-held surgical device 104 is shown, the details of which are described in U.S. Pat. App. Pub. 2018/344409. The surgical system 100 is capable of performing embodiments of the inventive method for verifying tracking array positional accuracy during a robotic-assisted orthopedic surgery. Briefly, the surgical system 100 includes a computer system 102, an articulating hand-held surgical device 104, and an optical tracking system 106. The computing system 102 may include a device computer 108, a planning computer 110, and peripheral devices such as a mouse 112, keyboard 114, joystick 116, pendant 118, foot pedal 120, and a display monitor 122 for displaying a graphical user interface (GUI). The device computer 108 is primarily dedicated to the operation of the hand-held surgical device 104 using data from the optical tracking system 106, while the planning computer 110 is primarily dedicated to the planning of the surgical procedure. The optical tracking system 106 includes two or more optical cameras/receivers 124, which may be assembled on a surgical lamp 126, a boom, or a stand. The tracking system 106 may also include a tracking computer 128. It should be appreciated that the computer processes may be shared in the computing system 102, where for example, the tracking computer 128 may directly control the hand-held surgical device 104, or a device computer 108 may determine the POSEs of objects in the OR based on data received directly from the optical cameras/receivers 124 and are able to perform the method as detailed with respect to FIG. 1. In addition, data between the computers and/or data from the hand-held surgical device 104 may be transferred via a wired or wireless connection. In particular embodiments, data is transferred to and from the hand-held surgical device 104 via actuated LEDs as described in U.S. Pat. Pub. No. 2017/0245945.

The articulating hand-held surgical device 104 is best seen in FIGS. 2B and 2C. The hand-held surgical device 104 includes a working portion 130, a hand-held portion 132, an end-effector 134, and a tracking reference device 136. The working portion 130 is actuated by two-linear actuators in the hand-held portion 132. The working potion 130 is therefore actuated in two-degrees of freedom (translational motion 'd', and rotational motion 'α') as shown between FIGS. 2B and 2C. The hand-held surgical device 104 can therefore position the end-effector 134 anywhere within the working limits of the working portion 130. In particular embodiments, the end-effector 134 is a drill-bit, while in other embodiments, the end-effector 134 is a bone-pin. The working portion 130 further includes a motor 138 for operating the end-effector 134 (e.g., rotating the drill bit, or rotating the bone-pin). The tracking reference device 136 is a tracking array having three or more active or passive fiducial markers. The fiducial markers may be arranged on a rigid body attached to the working portion, or the fiducial markers may be directly integrated on the working portion 130 of the hand-held surgical device 104.

The surgical system 100 of FIG. 2A further depicts a femur bone F, a tibia bone T, and a digitizer 140. The femur F and tibia T are shown each having a tracking reference device (136b, 136c) fixed to each bone. The digitizer 140 also includes a tracking reference device 136d. Here, the tracking reference devices (136b, 136c, 136d) are all tracking arrays having three or more fiducial markers arranged on a rigid body. As described above in an embodiment of the inventive method for verifying the positional accuracy of a tracking reference device during a robotic assisted-surgery, after the tracking reference devices (136b, 136c) are fixed to the bones, a verification mark is made/installed on the bone to assist in verifying the positional accuracy of the tracking reference devices (136b, 136c) on the bone.

Figure 3A:
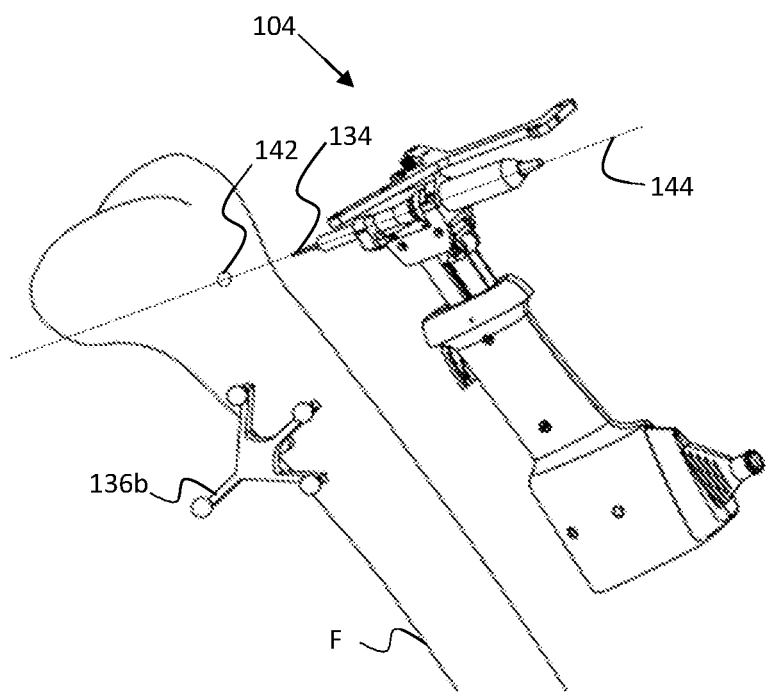
FIGS. 3A and 3B depict two scenarios for verifying the positional accuracy of a tracking reference device during a robotic assisted-surgical procedure, where
Figure 3B:
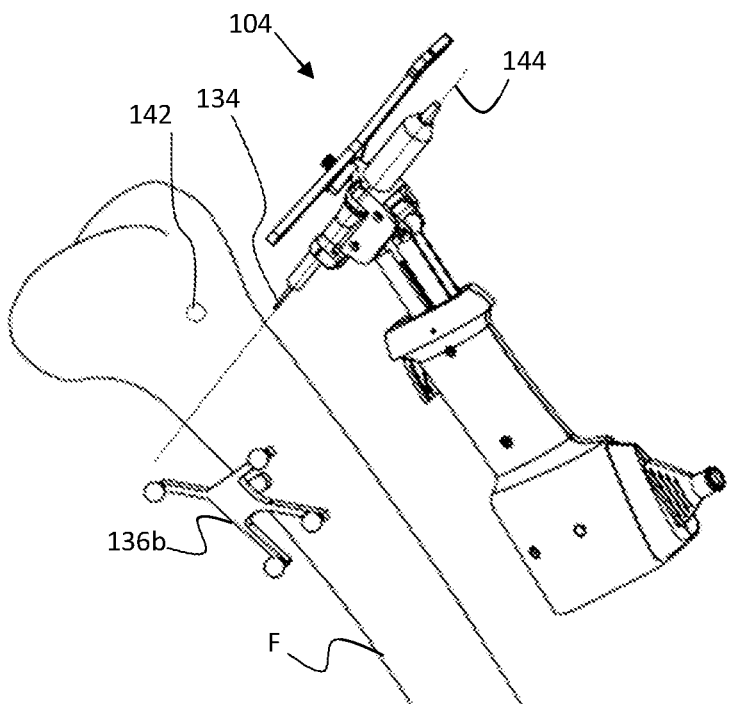
Figure 6:
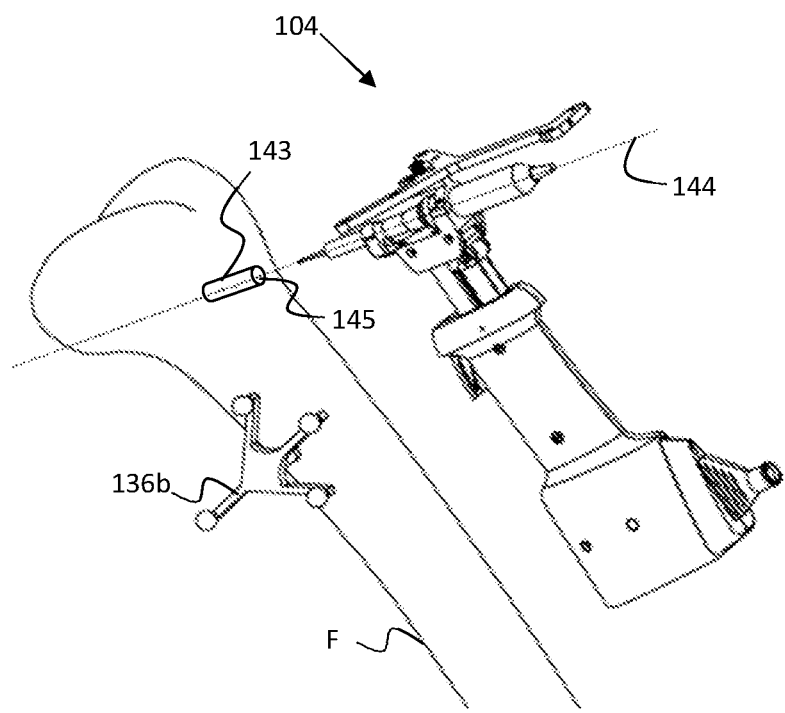
FIG. 6 depicts a scenarios for verifying the positional accuracy of a tracking reference device during a robotic assisted-surgical procedure with the use of a verification mark in the form of a bone-pin.

With the use of the hand-held surgical device 104 in the surgical system 100, a verification mark may be made/installed on the bone with a drill bit or bone-pin acting as the end-effector 134. The user may be prompted by the computing system 102 to create the verifying mark on the bone. The user then wields the hand-held surgical device 104 to a suitable location on the bone and creates the mark by inserting the drill-bit or bone-pin into the bone, thereby creating/installing the mark in the bone. In a particular embodiment, the user removes the drill-bit or bone-pin from the bone thereby leaving a verification mark in the form of a drill-hole or pin-hole 142 (as shown in FIGS. 3A and 3B). In other embodiments, as shown in FIG. 6, the user may leave or install a bone-pin 143, or other device, in the bone to be used as the verification mark. The verification mark may also or alternatively be a feature on the bone-pin 143 (or the other device) such as an end-point 145 or divot on the bone-pin 143. The feature (e.g., an end-point of a bone-pin 143) is preferably away from the surface of the bone, however, it should be appreciated that the bone-pin 143, or other device, in its entirety may be used as the verification mark. In either case, the POSE of the verification mark on the bone with respect to the coordinates of the bone tracking reference device (136b, 136c) is recorded and saved by the tracking system 106 for future positional accuracy verification. The POSE of the verification mark relative to the coordinates of the tracking reference device (136b, 136c) can be recorded because the POSE of the end-effector 134 and the POSE of the tracked reference device (136b, 136c) are tracking by a tracking system. In other embodiments, the verification mark may be made/installed on the bone without a surgical device (e.g., with the use of manual tools or standard surgical drill), where the POSE of the verification mark is recorded relative the tracking reference device by digitizing the verification mark with a tracked digitizer or a tracked surgical device after the verification mark is made/installed.

At any point after the creation of the verification mark, the user may verify the positional accuracy of the bone tracking reference device as follows. With reference to FIGS. 3A and 3B, two scenarios are shown, where FIG. 3A depicts no movement of a tracking reference device 136b relative to the femur F, and FIG. 3B depicts movement of the tracking reference device 136b relative to the femur F. To verify the positional accuracy, the user may prompt the surgical system 100 to do so, at which time the surgical system 100 instructs the end-effector 134 to align with the verification mark (in this case a hole 142 created in the bone). The surgical system 100 may likewise prompt the user to verify the positional accuracy periodically throughout the procedure. Once verification has been initiated, the user then wields the hand-held surgical device 104 towards the hole 142, where the working portion 130 is actively actuated to align the end-effector 134 with the hole 142. As shown in FIG. 3A, the end-effector 134 aligns with the hole 142 as can be seen by end-effector's axis 144 aligning with the hole 142. Here, the positional accuracy of the tracking reference device 136c is verified and no movement between the reference device 136b and the femur F has occurred. Conversely, as shown in FIG. 3B, the end-effector 134 does not align with the hole 142. The tracking reference device 136b has shifted relative to the femur F and the positional accuracy is clearly compromised. In the event the positional accuracy is compromised, the bone is re-registered to ensure accurate tracking thereafter. The tracking reference device 136b may also be re-fixed to the bone to provide better fixation.

With reference to FIG. 6, the positional accuracy may be verified using a verification mark in the form of a bone-pin 143. To verify the positional accuracy, the user may prompt the surgical system 100 to do so, at which time the surgical system 100 instructs the end-effector 134 to align with the bone-pin 143. The surgical system 100 may likewise prompt the user to verify the positional accuracy periodically throughout the procedure. Once verification has been initiated, the user then wields the hand-held surgical device 104 towards the bone-pin 143, where the working portion 130 is actively actuated to align the end-effector 134 with the bone-pin 143. As shown in FIG. 6, the end-effector 134 aligns with the bone-pin 143 as can be seen by end-effector's axis 144 aligning with the bone-pin 143. Here, the positional accuracy of the tracking reference device 136c is verified and no movement between the reference device 136b and the femur F has occurred. Conversely, if the end-effector 134 does not align with the bone-pin 142, then the tracking reference device 136b has shifted relative to the femur F and the positional accuracy is clearly compromised. In the event the positional accuracy is compromised, the bone is re-registered to ensure accurate tracking thereafter.

In another embodiment, the end-effector 134 may be programmed to align with the side of the bone-pin 143 to verify the positional accuracy. Once verification has been initiated, the user wields the hand-held surgical device 102 around the perimeter or to a side of the bone-pin 143, where the working portion 130 is actively actuated to align the axis of the end-effector 134 to match the axis of the bone-pin 143. If the axis of the end-effector 134 on the side of the bone-pin 143 aligns with the axis of the bone-pin 143, then the positional accuracy of the tracking reference device 136b is not compromised. Conversely, if the axes do not align, then the positional accuracy has been compromised and the bone should be re-registered to execute the procedure accurately.

The use of a hand-held surgical device 104 to verify the positional accuracy is particularly advantageous because the user is wielding the device 104 by hand, and the end-effector 134 can be quickly positioned in the region of the verification mark. This is opposed to a fully autonomous robotic arm, which may require slower movements for patient safety. In addition, it should be appreciated that alignment of an end-effector with the verification mark may be done in any 1 through 6 degrees of freedom. By aligning the end-effector to the side of a linear verification mark (e.g., bone-pin 142) would be an alignment in 2 degrees-of-freedom. Similarly, hovering above a point varication mark (e.g., a hole 143 or notch), but not actually touching the point verification mark is also a 2-degree-of-freedom alignment, while actually touching a point verification mark would be a 3 degree-of-freedom alignment. In particular embodiments, verification of the positional accuracy is performed without actually touching the verification mark.

Serial-Chain Robotic Surgical System

Figure 4:
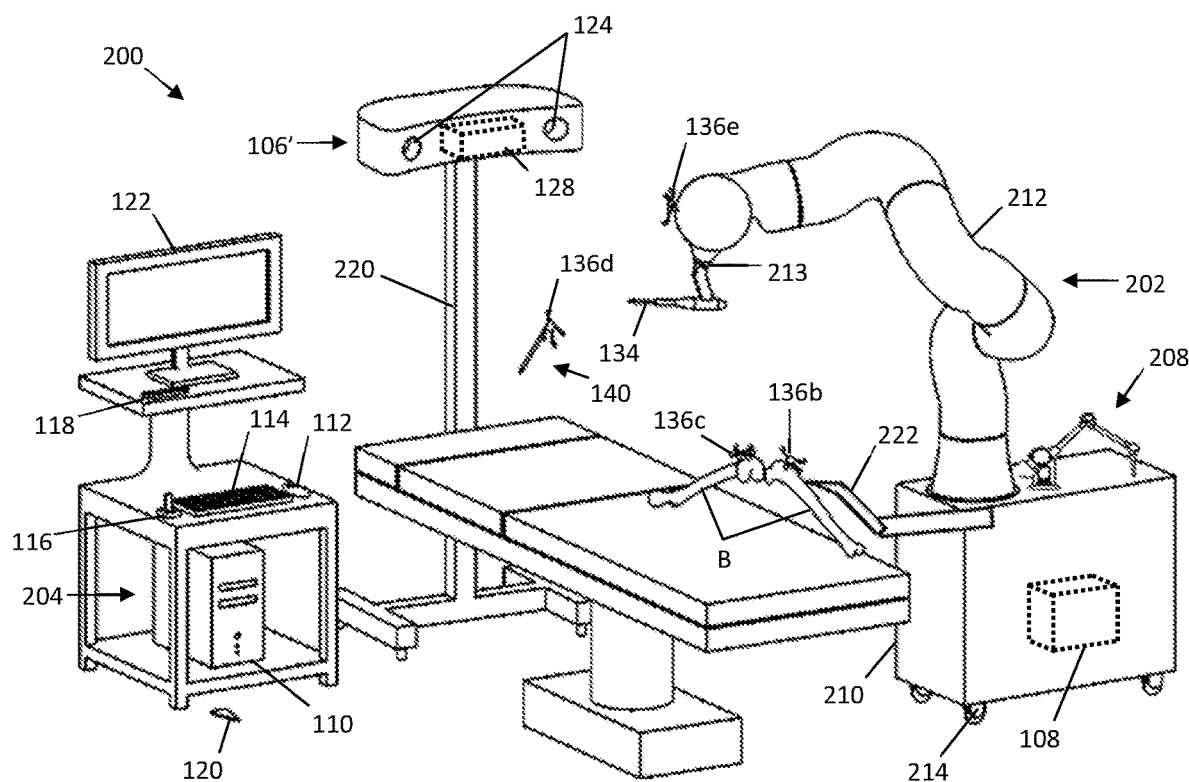
FIG. 4 depicts a prior art embodiment of a robotic surgical system capable of implementing embodiments of the inventive method to verify tracking array positional accuracy during a robotic-assisted orthopedic surgery.

With reference to FIG. 4, an embodiment of a robotic surgical system 200 is shown capable of implementing embodiments of the inventive method to verify tracking array positional accuracy during a robotic-assisted orthopedic surgery described above.

The surgical system 200 generally includes a surgical robot 202, a computing system 204, and a tracking system 106 and/or a mechanical digitizer arm 208.

The surgical robot 202 may include a movable base 210, a manipulator arm 212 connected to the base 210, an end-effector 134 located at a distal end of the manipulator arm 212, and a force sensor 213 positioned proximal to the end-effector 134 for sensing forces experienced on the end-effector 134. The base 210 includes a set of wheels 214 to maneuver the base 210, which may be fixed into position using a braking mechanism such as a hydraulic brake. The base 210 may further include an actuator to adjust the height of the manipulator arm 212. The manipulator arm 212 includes various joints and links to manipulate the end-effector 134 in various degrees of freedom. The joints are illustratively prismatic, revolute, spherical, or a combination thereof. In some embodiments, the surgical system 200 includes at least one of a tracked digitizer 140 or a mechanically tracked digitizer 208 attached to the base 210. The tracked digitizer 140 may include a tracking array 136d to be tracked by the tracking system 106, while the digitizer arm 208 may have its own tracking computer or may be directly connected with the device computer 218.

The computing system 204 generally includes a planning computer 110; a device computer 108; a tracking computer 128; and peripheral devices. The planning computer 110, device computer 108, and tracking computer 128 may be separate entities, one-in-the-same, or combinations thereof depending on the surgical system and is capable of performing the method detailed with respect to FIG. 1. Further, in some embodiments, a combination of the planning computer 110, the device computer 108, and/or tracking computer 128 are connected via a wired or wireless communication. The peripheral devices allow a user to interface with the surgical system components and may include: a mouse 112, keyboard 114, joystick 116, pendant 118, foot pedal 120, and a display monitor 122 for displaying a graphical user interface (GUI).

The planning computer 110 contains hardware (e.g., processors, controllers, and/or memory), software, data and utilities that are in some inventive embodiments dedicated to the planning of a surgical procedure, either pre-operatively or intra-operatively. This may include reading medical imaging data, segmenting imaging data, constructing three-dimensional (3D) virtual models, storing computer-aided design (CAD) files, providing various functions or widgets to aid a user in planning the surgical procedure, and generating surgical plan data. The final surgical plan may include pre-operative bone data, patient data, registration data including the POSE of the points P defined relative to the pre-operative bone data, implant position data, trajectory parameters, and/or operational data. The operational data may include: a set of instructions for modifying a volume of tissue that is defined relative to the anatomy, such as a set of cutting parameters (e.g., cut paths, spindle-speeds, feed-rates) in a cut-file to autonomously modify the volume of bone; a set of virtual boundaries defined to haptically constrain a tool within the defined boundaries to modify the bone; or a set of planes or drill holes to drill pins in the bone. In particular inventive embodiments, the operational data specifically includes a cut-file for execution by a surgical robot to autonomously modify the volume of bone, which is advantageous from an accuracy and usability perspective. The surgical plan data generated from the planning computer 110 may be transferred to the device computer 108 and/or tracking computer 128 through a wired or wireless connection in the operating room (OR); or transferred via a non-transient data storage medium (e.g., a compact disc (CD), a portable universal serial bus (USB) drive) if the planning computer 110 is located outside the OR.

The device computer 108 in some inventive embodiments is housed in the moveable base 210 and contains hardware, software, data and utilities that are preferably dedicated to the operation of the robotic surgical device 202. This may include surgical device control, robotic manipulator control, the processing of kinematic and inverse kinematic data, the execution of calibration routines, the execution of operational data (e.g., cut-files, the trajectory parameters), coordinate transformation processing, providing workflow instructions to a user, and utilizing position and orientation (POSE) data from the tracking system 106. The device computer 108 may further execute the positional accuracy verification routine as described herein.

The tracking system 106 may be an optical tracking system that includes two or more optical receivers 124 to detect the position of fiducial markers (e.g., retroreflective spheres, active light emitting diodes (LEDs)) uniquely arranged on rigid bodies. The fiducial markers arranged on a rigid body are collectively referred to as a tracking array (136b, 136c, 136d, 136e), where each tracking array 136 has a unique arrangement of fiducial markers, or a unique transmitting wavelength/frequency if the markers are active LEDs. The fiducial markers may likewise be integrated or attached with a device directly to act as a tracking array for that device. An example of an optical tracking system is described in U.S. Pat. No. 6,061,644. The tracking system 106 may be built into a surgical lamp, located on a boom, a stand 220, or built into the walls or ceilings of the OR. The tracking system computer 128 may include tracking hardware, software, data and utilities to determine the POSE of objects (e.g., bones B, surgical device 202) in a local or global coordinate frame. The POSE of the objects is collectively referred to herein as POSE data, where this POSE data may be communicated to the device computer 108 through a wired or wireless connection. Alternatively, the device computer 108 may determine the POSE data using the position of the fiducial markers detected from the optical receivers 124 directly. In addition, the tracking computer 128 or device computer 108 may record or store the POSE of the verification marks on the bone with respect to a bone tracking reference device.

The POSE data is used by the computing system 204 during the procedure to update the POSE and/or coordinate transforms of the bone B, the surgical plan, and the surgical robot 202 as the manipulator arm 212 and/or bone B move during the procedure, such that the surgical robot 202 can accurately execute the surgical plan. Data from the tracking system 106' is also used to execute the positional accuracy verification method as described herein, where the tracked POSEs of the bone B and the surgical device 202, are used to align the end-effector 134 to the verification mark to verify the positional accuracy of the tracking reference device.

FIG. 4 further depicts a mechanical tracking system 222. The mechanical tracking system 222 having two or more articulating linkages where a distal end of the tracking system 222 is fixed to the bone. Here, the distal end of the tracking system 222 may act as the tracking reference device on the bone if the bone B is to be mechanically tracked, as opposed to or in addition of an optical tracking system 106.

Figure 5A:
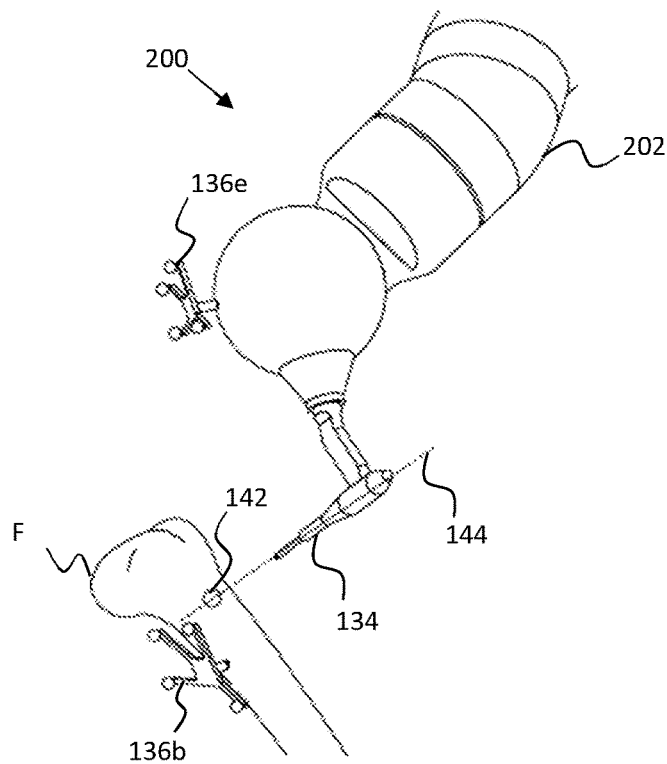
FIGS. 5A and 5B, illustrate the use of the robotic arm, of the robotic surgical system of FIG. 4, for controlling the end-effector to implement embodiments of the inventive method for verifying tracking array positional accuracy during a robotic-assisted orthopedic surgery, where
Figure 5B:
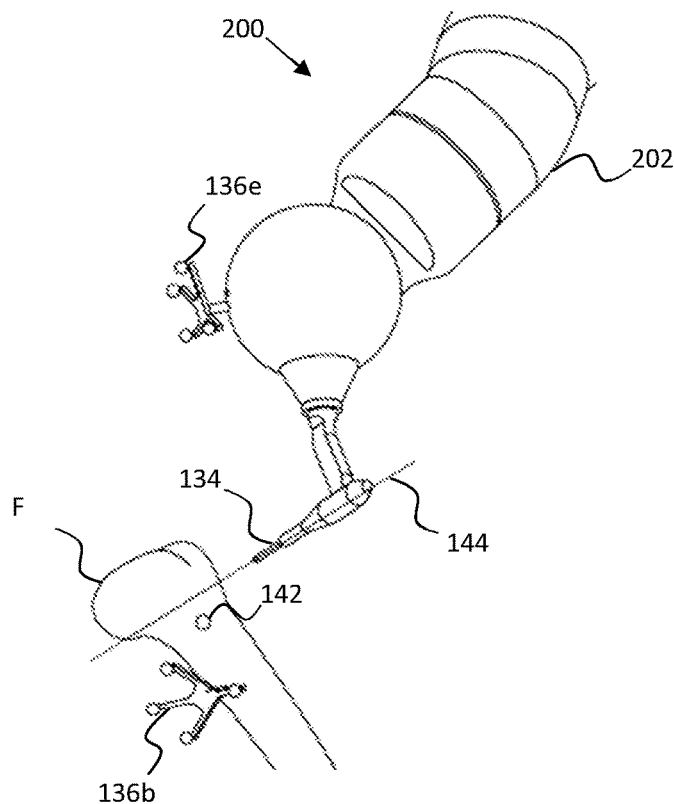

With reference to FIGS. 5A and 5B, illustrate the use of the robotic arm 202, of the robotic surgical system 200 of FIG. 4, for controlling the end-effector 134 to implement embodiments of the inventive method for verifying tracking array positional accuracy during a robotic-assisted orthopedic surgery. The end-effector 134 may be a drill-bit, bone-pin, or other device such as an end-mill or cutter. When the positional accuracy verification is initiated, the robotic arm 202 is instructed to align the end-effector 134 with a previously made/installed verification mark (in this case a hole 142 created on the bone). FIG. 5A depicts a scenario where the end-effector's axis 144 aligns with the hole 142 and therefore the positional accuracy is verified. Conversely, FIG. 5B depicts a scenario where the end-effector's axis 144 does not align with the hole 142 and therefore the positional accuracy of the reference tracking device 136b is compromised. In the scenario of FIG. 5B, the bone is re-registered to ensure accurate tracking thereafter. The tracking reference device 136b may also be re-fixed to the bone to provide better fixation.

The positional accuracy of the tracking reference device 136b with the use of a robotic arm 202 may also or alternatively be verified using a verification mark in the form of a bone-pin 143 as described with reference to the hand-held surgical device 104. That is, the end-effector 134 may be instructed to align with the axis of a bone-pin 143, either by hovering above the bone-pin 143 or aligning to the side of the bone-pin 143. Similarly, the positional accuracy of the tracking reference device 136b is verified if the axes align, and compromised if the axes do not align.

Other Embodiments

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient roadmap for implementing the exemplary embodiment or exemplary embodiments. It should be understood that various changes may be made in the function and arrangement of elements without departing from the scope as set forth in the appended claims and the legal equivalents thereof.

The invention claimed is:

1. A method for verifying positional accuracy of a tracking reference device, said method comprising:
storing in non-transient storage memory a position of a verification mark located on a bone with respect to a coordinate frame of a tracking reference device affixed to the bone; and
a robotic device moving an end-effector to align a longitudinal axis of the end-effector with a longitudinal axis of the verification mark to verify positional accuracy of the tracking reference device.

2. The method of claim 1 further comprising:
registering the bone with respect to the coordinate frame of the tracking reference device; and
re-registering the bone in the coordinate frame of the tracking reference device if the positional accuracy of the tracking reference device is compromised.

3. The method of claim 2 wherein the bone is registered using at least one of point-to-point matching, point-to-surface matching, laser scanning, image-to-image matching, or image-free registration techniques.

4. The method of claim 2 wherein the bone is registered to bone data in the coordinate frame of the tracking reference device.

5. The method of claim 1 wherein the tracking reference device is a tracking array or an electromagnetic sensor.

6. The method of claim 5 wherein the tracking array further comprises three or more active or passive fiducial markers.

7. The method of claim 1 wherein the tracking reference device is affixed to the bone using at least one of bone pins, bone screws, clamps, or other fastening elements.

8. The method of claim 1, wherein the tracked reference device is a tracking array, and wherein the optical tracking system further determines a location of a second tracking array affixed to the robotic device.

9. The method of claim 1 wherein said verification mark is at least one of a physical hole or notch created in the bone.

10. The method of claim 1 wherein said verification mark is a device installed in the bone.

11. The method of claim 1 wherein the robotic device is a hand-held robotic device.

12. The method of claim 1 wherein the end effector is at least one of drill-bit, a bone-pin, end-mill, or cutter.

13. The method of claim 1 further comprising creating or installing the verification mark on the bone using the robotic device.

14. The method of claim 1 further comprising prompting a user to verify the positional accuracy during a surgical procedure.

15. The method of claim 1 further comprising receiving a user prompt to verify the positional accuracy during a surgical procedure.

16. A surgical system comprising:
a surgical robot for moving an end effector; and
one or more computers comprising software programmed to:
store in non-transient storage memory a position of a verification mark located on a bone with respect to a coordinate frame of a tracking reference device affixed to the bone; and
instruct the surgical robot to move the end-effector to align a longitudinal axis of the end-effector with a longitudinal axis of the verification mark to verify the positional accuracy of the tracking reference device.

17. The surgical system of claim 16 wherein the surgical robot is a hand-held robotic device.

18. The surgical system of claim 16 wherein the one or more computers comprise software further programmed to register the bone with respect to the coordinate frame of the tracking reference device.

19. The surgical system of claim 16 wherein the tracking reference device is a tracking array.

20. The surgical system of claim 16 wherein the verification mark is at least one of: i) a physical hole or notch created in the bone; or ii) a device installed in the bone.

* * * * *